No. 809,157. PATENTED JAN. 2, 1906.
M. N. WEYL.
PHOTOMECHANICAL MULTICOLOR PRINTING.
APPLICATION FILED DEC. 17, 1902.
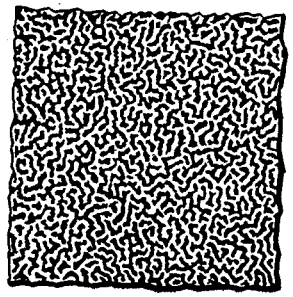
WITNESSES:
INVENTOR
Maurice N. Weyl
BY
ATTORNEY.

UNITED STATES PATENT OFFICE.

MAURICE N. WEYL, OF PHILADELPHIA, PENNSYLVANIA.

PHOTOMECHANICAL MULTICOLOR-PRINTING.

No. 809,157.  Specification of Letters Patent.  Patented Jan. 2, 1906.

Application filed December 17, 1902. Serial No. 135,504.

*To all whom it may concern:*

Be it known that I, MAURICE N. WEYL, a citizen of the United States, residing in the city of Philadelphia, State of Pennsylvania, have invented certain new and useful Improvements in Photomechanical Multicolor-Printing, of which the following is a full, clear, and exact description, reference being had to the accompanying drawings, forming a part of this specification.

My invention relates to multicolor-printing from photomechanically-prepared plates; and it consists of the process hereinafter described, having for its object or purpose to obtain from such prepared printing-plates multicolored impressions which shall be free from the objectionable moire and cross-lined effects produced by photomechanically prepared and superposed half-tone plates as commonly employed not only in black and tint (two-color) work, but in multicolor-work.

In the accompanying drawing is shown a section of one of a variety of irregular grain or stipple screens such as I use in my process and which is shown in said drawing enlarged seven times the size of the original as I use it to bring out more clearly the irregular character of the pattern on the screen, such as is adapted to be used in the application of my process.

In multicolor-printing from half-tone plates or from transfers on stone from the prepared negatives as commonly practiced the first negative for each color has been prepared by means of an interposed color-filter. For example, to produce a three-color-process plate three similar negatives are made by means, respectively, of interposed light-filters—namely, purple, (to exclude all but yellow rays,) green, (to exclude all but the red rays,) and reddish-orange, (which excludes all but the blue rays, to affect the sensitized plates)—and from positives of these several negatives other negatives are made by means of interposed ruled or lined screens having two sets or series of lines, those of each set being parallel and the two sets of lines crossing each other at right angles, forming a net; but the screen is shifted in position for each plate, so that the ruled lines reproduced on the negative for the first plate are, say, at fifteen degrees and one hundred and five degrees to the horizontal; for the second plate, seventy-five degrees and one hundred and sixty-five degrees to the horizontal, and for the third plate forty-five degrees and one hundred and thirty-five degrees to the horizontal. From these negatives the usual half-tone printing-plates or transfers on stone are made, and from these latter printed impressions upon paper or other substance are made, superimposed one upon the other in proper register, using the three primary colors mentioned and resulting in giving correct reproductions of the original object or picture. For sake of economy, but with less desirable results, the making of the second positive plate may be omitted, and the first and third steps described may be consolidated by making the final negative through simultaneously-interposed light filters and screens.

The crossing of the lines on the ruled screens form dots at the intersections on the negatives, causing a blurring effect (due to a regular series of dots produced by the hexagonal network of lines) in the resultant finished impressions, and unless such cross-lined screens are turned or shifted to a different angle for each color-negative a result is produced technically known as a "moire" effect. Efforts have been made from time to time to overcome this objectionable moire effect, among others the use in a single net or cross-lined screen, which is shifted to a different position for each negative in the set, of a set of screens each containing a single series of parallel lines, but the lines on each screen running in a different direction or angle from the lines on each of the other two or more screens used, as set forth in the United States Patent to William Kurtz, No. 489,396, dated May 30, 1893. I have discovered, however, that this latter plan is a needless and expensive multiplication of screens and that the avoidance of the moire effect and also of the blurring effect, which results from all "lined" screens of any character, can be accomplished by the use of a single screen constructed in the manner and used according to the method constituting my invention, which consists in varying the first-above-described and usual half-tone process, only in that in producing the final color-negatives for transfer to stone or copper I discard the net-lined or crossed screen shifted in the production of each negative for each color and substitute therefor a single screen on which has been deposited or etched an irregular pattern, technically known as a "grain" or "stipple" pattern, and with such a screen I can maintain it in the same position for each negative and without shifting it, as before required in the case of cross-lined screens, but aside from that I avoid entirely the blurring effect caused by all lined screens, whether of net or cross-lines (as in the process first above described) or of single series of parallel lines, (as in the modified process last above described.)

By "irregular," "grain," or "stipple" I mean a pattern formed by an irregularly-distributed number of dots, whether of the same or varying sizes and shapes, so disposed that the visual effect of the whole surface is one of an even regular tint.

In carrying out my improved process, practically, there is first prepared for, say, a three-color print, three positives of the object or picture, in yellow, red, and blue, respectively, from three negatives obtained through light or color filters, as before described, and from these positives I produce my negatives to be transferred to the printing-plate by the interposition of a single screen etched or otherwise prepared with an irregular, grain, or stipple pattern, and without shifting it during the production of each of the three negatives. In other words, I have discovered that with the use of such a screen the usual shifting is not required, because whether shifted or held fixedly its pattern is such as to give like results under either condition. I have also discovered that the objectionable net or cross-lined screen so shifted and also the use of three screens each containing a series of parallel lines, but the lines of each of which run in different angles or directions, cannot produce the non-lined result at all nor avoid the moire effect to so great a degree as the use of a single screen, not lining it with net or cross-lines, not shifting it for each negative, nor (what is the same thing in effect) using the three single-lined screens, one for each negative of a three-color print; but in lieu of each of these methods, using a stipple screen which has no regular succession of lines or figures, and hence which need not be shifted in the same position for each of the three negatives. The result is a complete avoidance of any "line" blur and of moire. It enables the use of the whole surface of the screen, and as it produces no regular succession of lines and dots on the picture a far greater amount of contrast is brought about, and the picture is consequently stronger and clearer.

Having thus described my invention, what I claim as new, and desire to secure by Letters Patent, is—

1. An improved process of photomechanical multicolor-printing, which consists in first preparing the required set of primary color-positives of the object or picture sought to be reproduced, and then preparing therefrom the negatives which are transferred to stone or copper, by interposing in the production of each negative in the set for a multicolor impression a single screen prepared with an irregular, grain or stipple pattern and which is thereby adapted to be so used without shifting its position during each of the several exposures; substantially as described.

2. An improved process of photomechanical multicolor-printing, which consists in preparing primary color-negatives for transfer to copper or stone, by simultaneously interposing in the production thereof the requisite color-filter for each negative in the set and a single screen etched or otherwise prepared with an irregular, grain or stipple pattern and which may be maintained in one position and without shifting during the exposure; substantially as described.

3. An improved process of producing photomechanical multicolor-prints, without line effects, which consists in preparing the copper or stone printing-surfaces from a set of negative films in the production of each of which the requisite color-filter and a screen of irregular, grain or stipple pattern has been interposed; and then producing the finished picture by superposing impressions from said plates or stones, one over the other, in proper register; substantially as described.

In testimony whereof I have hereunto affixed my signature this 12th day of December, A. D. 1902.

MAURICE N. WEYL.

Witnesses:
GEO. W. REED,
A. M. BIDDLE.